United States Patent [19]

Peterson et al.

[11] Patent Number: 5,471,193
[45] Date of Patent: Nov. 28, 1995

[54] TAMPER-RESISTANT VEHICLE EVENT RECORDER

[75] Inventors: Francis C. Peterson, Prescott; James A. Weinert, West Bend, both of Wis.

[73] Assignee: Phillips Plastics Corporation, Prescott, Wis.

[21] Appl. No.: 90,327

[22] Filed: Jul. 12, 1993

[51] Int. Cl.$^6$ .................................................. B60Q 1/00
[52] U.S. Cl. .......................... 340/438; 340/441; 340/461; 340/825.15; 364/424.04
[58] Field of Search ................................... 340/438, 436, 340/439, 441, 825.15, 461, 945; 102/293, 202.5; 428/688; 364/424.04

[56] References Cited

U.S. PATENT DOCUMENTS

| | | | |
|---|---|---|---|
| 3,756,088 | 9/1973 | Inoue | 74/89.17 |
| 3,779,091 | 12/1973 | Inoue | 74/109 |
| 3,983,624 | 10/1976 | Gross | 102/202.5 |
| 4,086,562 | 4/1978 | Hasegawa | 340/436 |
| 4,229,726 | 10/1980 | Deaton et al. | 340/933 |
| 4,409,663 | 10/1983 | Becker et al. | 364/561 |
| 4,438,424 | 3/1984 | Yasui | 340/436 |
| 4,485,153 | 11/1984 | Janikowski et al. | 428/688 |
| 4,493,988 | 1/1985 | Ichimura | 235/96 |
| 4,559,637 | 12/1985 | Weber | 377/24 |
| 4,638,289 | 1/1987 | Zottnik | 340/436 |
| 4,692,882 | 9/1987 | Skovgaard et al. | 340/441 |
| 4,725,009 | 2/1988 | Fahrbach | 242/4 B |
| 4,760,218 | 7/1988 | Gutman | 200/5 R |
| 4,787,040 | 11/1988 | Ames et al. | 364/424.01 |
| 4,811,240 | 3/1989 | Ballou et al. | 364/518 |
| 4,822,319 | 4/1989 | Glover et al. | 464/101 |
| 4,835,546 | 5/1989 | Keller | 346/33 |
| 4,914,278 | 4/1990 | Rudolph et al. | 235/10 |
| 4,939,652 | 7/1990 | Steiner | 340/438 |
| 4,970,378 | 11/1990 | Bleicher | 235/96 |
| 5,046,425 | 9/1991 | Gibbons | 102/293 |
| 5,185,700 | 2/1993 | Bezos et al. | 340/539 |
| 5,204,547 | 4/1993 | Schumacher et al. | 340/436 |

*Primary Examiner*—Brent Swarthout
*Assistant Examiner*—Nina Tong
*Attorney, Agent, or Firm*—Merchant, Gould, Smith, Edell, Welter & Schmidt

[57] ABSTRACT

A tamper-resistant vehicle event recorder having a combustible film on a polymeric substrate, an ignition mechanism for igniting the combustible coating and an activation mechanism connected to the ignition mechanism for activating the ignition mechanism in response to a vehicular event.

10 Claims, 3 Drawing Sheets

TAMPER-RESISTANT VEHICLE EVENT RECORDER

FIELD OF THE INVENTION

The present invention relates to devices for permanently recording the occurrence of an event occurring in a vehicle.

BACKGROUND ART

Automobiles and other vehicles include complex safety systems such as air-bags as well as traditional instrumentation such as odometers. In general it is desirable to have an unambiguous and tamper proof or tamper resistant indication that a certain vehicle event has occurred. For example it is desirable to indicate that the air-bag has been deployed since this indicates that the vehicular chassis has been involved in a collision. In a similar fashion it is desirable to indicate that the odometer has logged a preset mileage interval or intervals such as 10,000 miles, for warrantee verification and the like.

At present there are no generally available, permanent and tamper proof devices to record and display the occurrence of such events.

SUMMARY OF THE INVENTION

The tamper-resistant vehicle event recorder of the present invention is electrically activated and generates a non-reversible physical change to a plastic substrate. This marker is displayed to the vehicle operator. In general the recorder includes a plastic substrate layer which will normally form part of a vehicle structure such as the dashboard or the like. A metallic igniter is formed on the substrate. A combustible material is layered onto the metallic igniter. In operation the vehicular event results in the passage of current through the recorder which heats up the igniter and causes the combustible material to ignite. The heat released by combustion causes a permanent deformation of the plastic substrate or a visible change in the substrate, or preferably both a mechanical deformation and visible change together.

BRIEF DESCRIPTION OF THE DRAWINGS

An illustrative event recorder is shown in the drawings where identical reference numerals indicate identical structure throughout, and wherein.

DETAILED DESCRIPTION OF THE INVENTION

Figure 1:
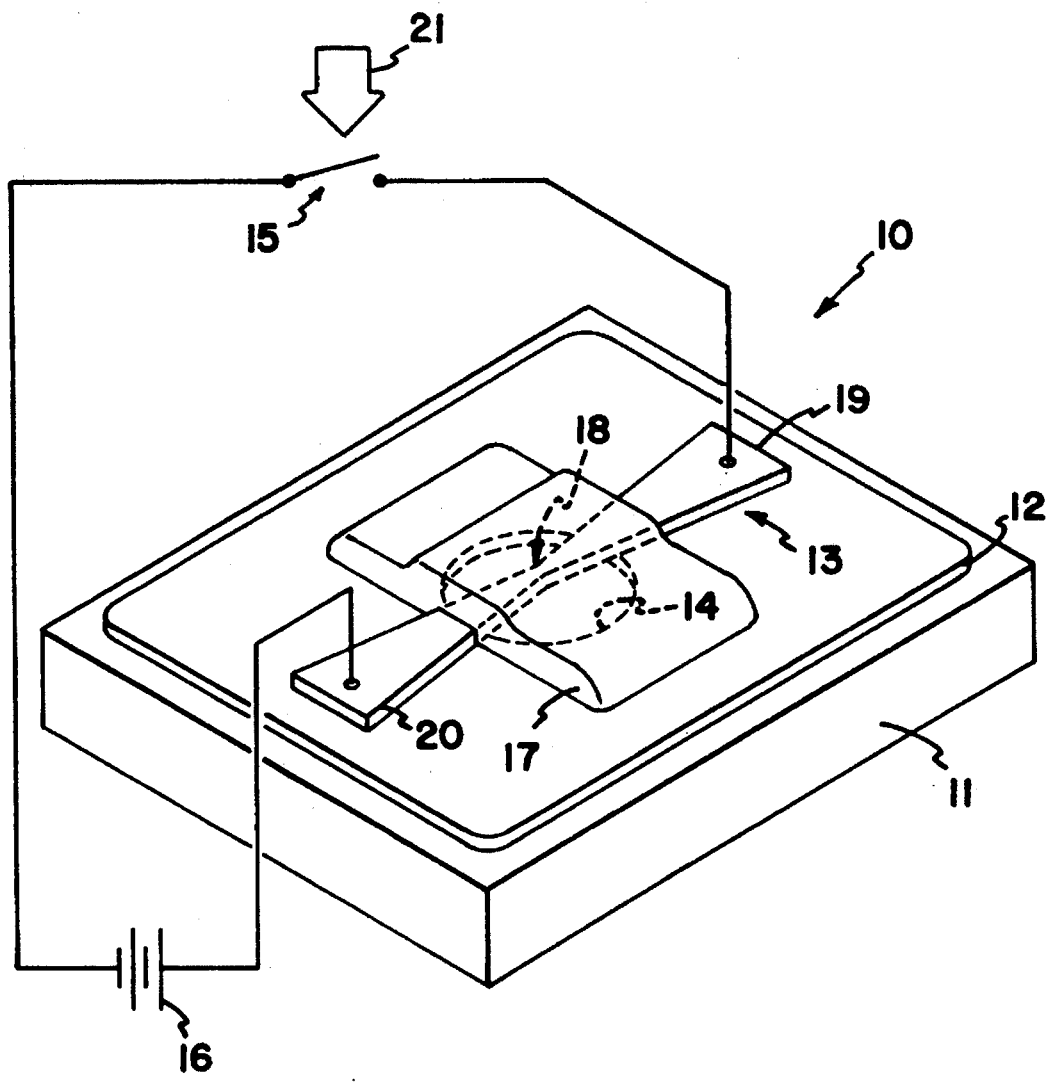
FIG. 1 shows a perspective view of the event recorder.

FIG. 1 shows the vehicle event recorder 10 which includes a polymeric substrate 11, which will typically be formed as a portion of the vehicle dashboard. In practice this polymeric substrate 11 will have a graphic design 12 or indicia silkscreened onto one surface. The graphic 12 will include an image aperture 14. An igniter 13 is next screened onto this polymeric substrate 11. Ultimately this igniter will be attached to a battery 16 and switch 15. The igniter 13 is overlaid with a combustible fuel coating 17. In use, a vehicular event 21 will close the switch 15 which couples electrical current from a battery 16 to the igniter 13. The igniter 13 heats up and initiates combustion of the combustible fuel coating 17. The combustion of the combustible fuel coating 17 creates a visually apparent marking of the graphic or indica on the polymeric substrate 11. In some cases if the polymeric substrate is sufficiently thin the substrate will deform which may be sensed tactile and which is difficult to disguise.

In the preferred embodiment, the polymeric substrate 11 could be one of any polymeric materials which either accept or have been treated to accept printing inks. One such material is polycarbonate which is currently used for automobile dashboards. In use it is expected that the normal "black" graphic layer will include one or more image apertures for one or more event recorders.

The preferred combustible fuel coating 17 is an ink which includes a combustible resin. An example of one such ink is a K. C. Nazdar 8825 white ink. The K. C. Nazdar 8825 ink is a vinyl acrylic ink with a titanium dioxide pigment, a combustible solvent and combustible resin. Because the residual solvents in these types of inks continue to evaporate over time, these inks have a tendency to lose some of their combustion capabilities. Therefore, it is further preferred to add an additional combustible material to the ink. In the preferred embodiment, 10% by weight benzoin (Kodak) is added to the Nazdar ink to maintain the combustion characteristics of the combustible fuel coating 17. Those skilled in the art would recognize that other combustible materials could be added to the ink as an alternative or additional combustible fuel additive, and the amount of additive appears to be non-critical. However, benzoin is preferred because it is readily available, low cost and does not react with the conductive ink over extended time intervals.

The preferred method for applying the combustible fuel coating 17 to the polymeric substrate 11 is to silkscreen the combustible fuel coating 17 onto the polymeric substrate 11 through a 230 polyester mesh. Typically the thickness of this coat will be between 10–20 microns.

Those skilled in the art would recognize that other methods could be used for applying the combustible fuel coating 17 to the polymeric substrate 11 and that various thicknesses of the combustible coating are operable with the present invention. However, the application of the combustible fuel coating 17 by a screen printing device is preferred because of its ease of application and low cost. In addition, because many other informational displays are currently screen printed onto vehicle dashboards, screen printing the combustible fuel coating 17 onto a dashboard as part of a vehicle event recorder 10 provides manufacturing benefits as well.

The vehicle event recorder 10 also includes an igniter 13 for igniting the combustible fuel coating 17. In the preferred embodiment, the igniter 13 is a screen printed conductive ink containing conductive metallic materials such as silver. The igniter 13 has a first terminal 19 and a second terminal 20 which neck down to a thin igniter strip portion 18.

In general the first terminal 19 and the second terminal 20 have a larger cross-sectional area than the igniter strip portion 18. In the preferred embodiment, the igniter 13 is made by silk-screening a conductive silver ink mixed with 5% by weight of aluminum dust onto the polymeric substrate 11. The conductive ink may be silkscreened through a 230 polyester mesh such that the ignition means 13 had a thickness of approximately 10–20 microns. The cross-sectional area of the igniter strip 18 is sized such that the combustible fuel coating 17 will ignite upon the passing of a current of an approximately one ampere through the ignition means 13.

While the use of a conductive silver ink loaded with aluminum is preferred. It is may be possible to use other metallic dust such as zinc, magnesium or the like, rather than the aluminum/silver material. Those skilled in the art would recognize that other ignition means could be used with the present invention, such as fuse-like nicrome wire arrangements or the like. However, the use of a screen printed silver ink mixed with 5% by weight aluminum dust is preferred for use with the invention because of cost and compatibility with the other manufacturing steps.

The igniter 17 is connected to a switch 15 which may be the inertial sensor used with air-bags in recently produced cars. The switch 15 and battery 16 pass approximately one amp of current through the igniter 13 upon the occurrence of a predetermined vehicular event 21 like an air bag deployment or odometer reading. Other types of activation means or switches could be used with the present invention including other trip switches which would send either AC or DC current to the ignition means 13.

Figure 2A:
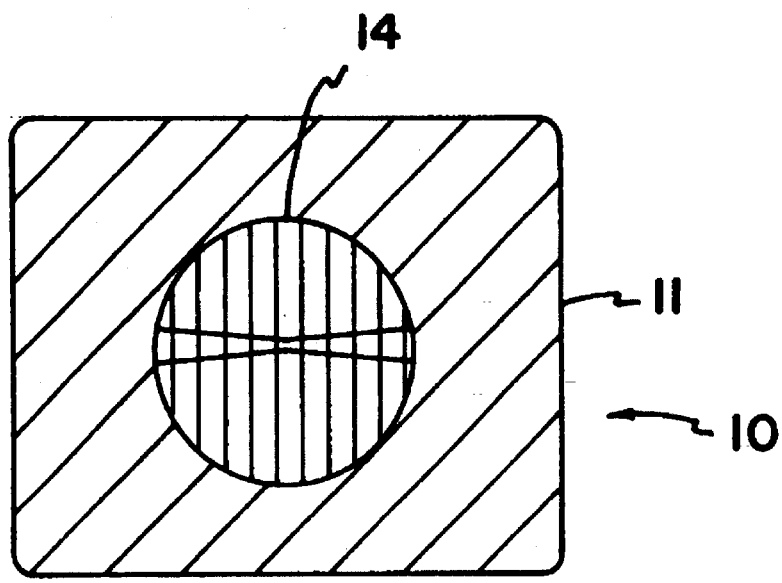
FIG. 2A shows a preferred event recorder.

FIG.2A depicts the event recorder 10 in the intact or un-burned state. The polymeric substrate 11 has a graphic background indicated by diagonal hatching which defines an aperture 18. In many automotive applications this graphic would be black. The preferred inks useful for the combustible layer will typically be white, providing high contrast as indicated by the vertical hatching within the circumference of the aperture 18. The igniter 13 is also visible within the aperture 18 but in most applications the small size of the igniter will render it difficult to see.

Figure 2B:
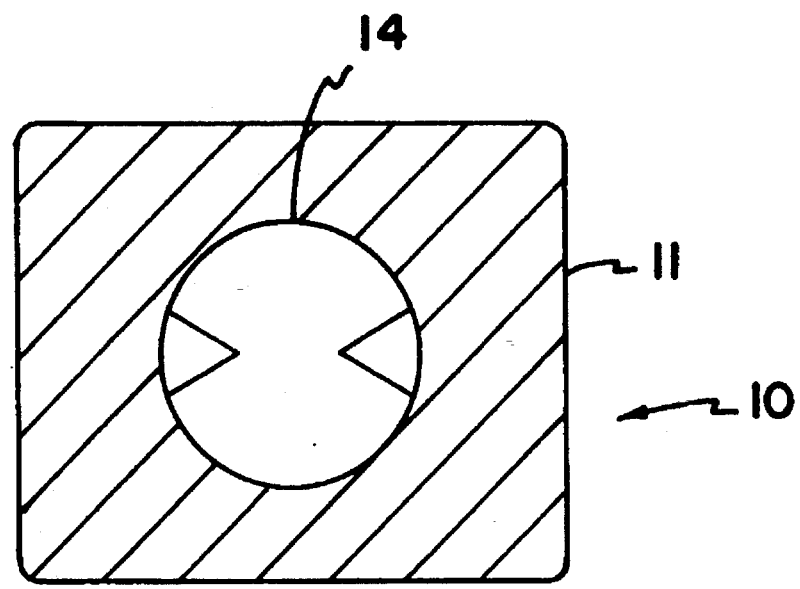
FIG. 2B shows a preferred event recorder.

FIG.2B depicts the event recorder 10 in the activated or indicating state. Here the combustible fuel coating has burned off and the igniter strip is burned away.

Figure 3E:
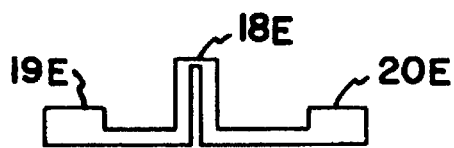
FIG. 3E shows an illustrative pattern for the igniter.
Figure 3A:
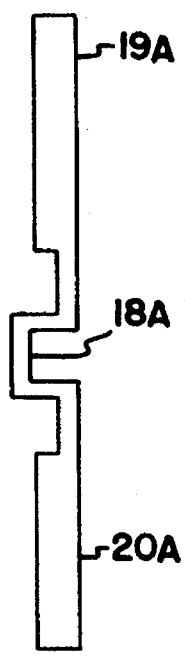
FIG. 3A shows an illustrative pattern for the igniter.
Figure 3B:
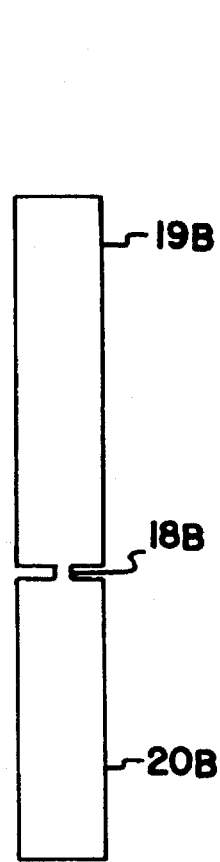
FIG. 3B shows an illustrative pattern for the igniter.
Figure 3C:
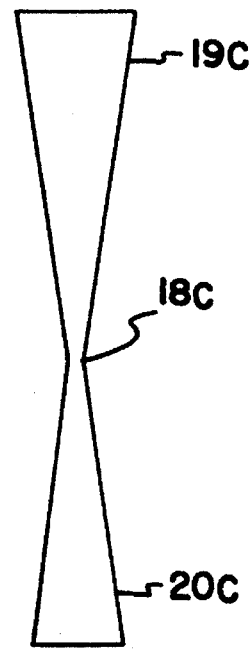
FIG. 3C shows an illustrative pattern for the igniter.
Figure 3D:
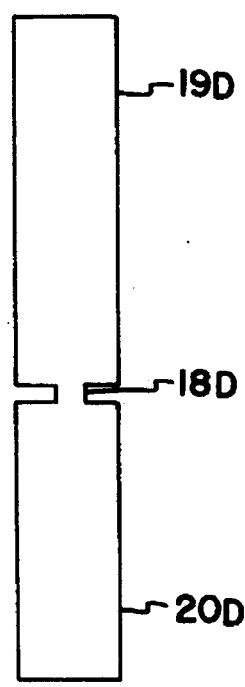
FIG. 3D shows an illustrative pattern for the igniter.

FIG.3A–E depict a number of igniter geometries which have been tested. In each case the terminal portions 19 and 20 are connected by an igniter strip 18. In Versions such as those shown in FIG. 3B and FIG. 3D the terminals conduct heat away from the strip reducing the amount of time the strip remains hot. Also such geometries are not expected to be as tolerant of igniter current. Testing has suggested that the "hourglass" geometry of FIG. 3C is the best shape at present. This preferred shape is characterized by a gradually tapering terminal portion which connect to a reduced cross-section igniter strip portion 18. With a thickness of less than 20 microns of the materials disclosed above the strip remains hot for an estimated one half second which is sufficient to reliably ignite the fuel coating 17.

Although characteristics and advantages together with details for structure, materials, function and process steps, have been described in reference to the preferred embodiment herein, it is understood that the disclosure is illustrative. To that degree, various changes made, especially to the matters of shape, size and arrangement, to the full extent extended by the general meaning of the terms in which the appended claims are expressed, are within the principles of the present invention.

What is claimed is:

1. A temper-resistant vehicle event recorder comprising:
   (a) a polymeric substrate;
   (b) a combustible fuel coating on said polymeric substrate;
   (c) an igniter for igniting said combustible fuel coating; and
   (d) activation means connected to said igniter for activating the igniter in response to a vehicular event.

2. A tamper-resistant vehicle event recorder according to claim 1, wherein said combustible fuel coating is an ink having a combustible resin mixed with Benzoin.

3. A tamper-resistant vehicle event recorder according to claim 1, wherein said igniter is made from a conductive ink which has been mixed with a combustible dust, and wherein said igniter has a first terminal portion and a second terminal portion, connected by an igniter strip portion having a smaller cross sectional area than said first terminal portion and said second terminal portion.

4. A tamper-resistant vehicle event recorder according to claim 1, wherein said activation means comprises a battery coupled to a switch to send a current of one ampere through said igniter in response to the vehicular event.

5. A method for making a tamper-resistant vehicle event recorder comprising:
   (a) providing a polymeric substrate with first and second sides;
   (b) coating said first side of said polymeric substrate with an igniter for igniting a combustible film, said igniter having a first terminal portion and a second terminal portion, connected together by an igniter strip portion having a smaller cross sectional area than said first terminal portion or said second terminal portion;
   (c) coating said first side of said polymeric substrate with a combustible fuel coating such that said combustible coating is in contact with said igniter strip portion of said igniter; and
   (d) connecting said ignitor to an activation mechanism which is arranged and configured to send an electrical current of one ampere through said igniter upon the occurrence of a predetermined vehicular event.

6. A tamper-resistant vehicle event recorder comprising:
   (a) a polymeric substrate;
   (b) ignition means on said polymeric substrate having a first tapered terminal portion and a second tapered terminal portion, said first and second portions being connected by an igniter strip portion having a smaller cross-sectional area than either said first terminal portion or said second terminal portion;
   (c) a combustible fuel coating on said polymeric substrate overlying said igniter strip portion of said igniter; and
   (d) activation means connected to said igniter for activating the ignition means in response to a vehicular event.

7. A temper-resistant vehicle event recorder according to claim 6, wherein said igniter is made from a conductive ink mixture having approximately a 5 to 15% by weight combustible metal dust mixed with a conductive ink, said conductive ink mixture being silkscreened onto said polymeric substrate.

8. A tamper-resistant vehicle event recorder according to claim 7, wherein said conductive ink mixture is a 5 to 15% by weight aluminum dust mixed with a conductive silver ink.

9. A tamper-resistant vehicle event recorder according to claim 6, wherein said combustible coating is an ink having a combustible resin that has been mixed with 10% by weight benzoin.

10. A method for making a tamper-resistant vehicle event recorder comprising:
   (a) providing a polymeric substrate with first and second sides;
   (b) screen printing said first side of said polymeric substrate with a conductive ink mixture to form an igniter for igniting a combustible fuel layer, said igniter having a first terminal portion and a second terminal portion, and an igniter portion between said first terminal portion and said second terminal portion having a smaller cross-sectional area than either said first terminal portion or said second terminal portion;

(c) screen printing said first side of said polymeric substrate with a combustible fuel coating such that said combustible coating is in contact with said igniter portion of said igniter; and (d) connecting said igniter to an activation mechanism which is arranged and configured to send an electrical current of at least one ampere through said igniter upon the occurrence of a predetermined vehicular event.

* * * * *